(12) United States Patent
Du

(10) Patent No.: US 10,469,488 B2
(45) Date of Patent: *Nov. 5, 2019

(54) SECURITY VERIFICATION METHOD, APPARATUS, AND SYSTEM

(71) Applicant: Tencent Technology (Shenzhen) Company Limited, Shenzhen, Guangdong (CN)

(72) Inventor: Juan Du, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/957,528

(22) Filed: Apr. 19, 2018

(65) Prior Publication Data

US 2018/0248870 A1 Aug. 30, 2018

Related U.S. Application Data

(63) Continuation of application No. 15/167,384, filed on May 27, 2016, now Pat. No. 9,985,965, which is a
(Continued)

(30) Foreign Application Priority Data

Mar. 17, 2014 (CN) .......................... 2014 1 0099385

(51) Int. Cl.
*H04L 29/06* (2006.01)
*G06F 21/31* (2013.01)
*H04N 5/225* (2006.01)

(52) U.S. Cl.
CPC .......... *H04L 63/0861* (2013.01); *G06F 21/31* (2013.01); *H04N 5/225* (2013.01); *G06F 2221/2133* (2013.01)

(58) Field of Classification Search
CPC ...... H04L 63/0861; G06F 21/31; H04N 5/225
See application file for complete search history.

(56) References Cited

U.S. PATENT DOCUMENTS 6,760,490 B1 7/2004 Zlotnick

FOREIGN PATENT DOCUMENTS

| CN | 101201939 A | 6/2008 |
|---|---|---|
| CN | 103139204 A | 6/2013 |
| CN | 103179092 A | 6/2013 |

OTHER PUBLICATIONS

Pfister (Google Static Maps Playground, 2010, 1 page) (Year: 2010).*

(Continued)

*Primary Examiner* — Oleg Korsak
(74) *Attorney, Agent, or Firm* — Brinks Gilson & Lione

(57) ABSTRACT

A security verification method, apparatus, and system relate to the field of computer security technologies, and are used to improve reliability of the verification code technology. In the method, an image capture request carrying an image capture parameter is sent to a server end; a live view picture returned by the server end is received, where the live view picture is obtained by performing live view image capture according to the image capture parameter and prestored street view tile information; and a security verification operation is performed according to the live view picture.

16 Claims, 5 Drawing Sheets

Related U.S. Application Data continuation of application No. PCT/CN2015/074305, filed on Mar. 16, 2015.

(56) References Cited

OTHER PUBLICATIONS

Gao et al. (A Novel Image Based CAPTCHA Using Jigsaw Puzzle, IEEE 2010 pp. 351-356) (Year: 2010).*
International Search Report received in PCT Application No. PCT/CN2015/074305 dated Jun. 15, 2015.

\* cited by examiner

SECURITY VERIFICATION METHOD, APPARATUS, AND SYSTEM

CROSS-REFERENCE TO RELATED APPLICATIONS

This application is a continuation of U.S. application Ser. No. 15/167,384 filed May 27, 2016, which claims the benefit of International Application No. PCT/CN2015/074305, filed on Mar. 16, 2015, which claims priority to Chinese Patent Application No. 201410099385.1, filed on Mar. 17, 2014, both of which are incorporated herein by reference in their entireties.

FIELD OF THE TECHNOLOGY

The present disclosure relates to the field of computer security technologies, and in particular, to a security verification method, apparatus, and system.

BACKGROUND OF THE DISCLOSURE

Currently, for preventing a user from utilizing a robot for automatic registration, login, and posting spam, many websites use a verification code technology. The verification code technology refers to that a string of randomly-generated numbers or symbols are used as verification code information and added into a generated picture, some interference pixels are added on the picture to prevent OCR, a user identifies the verification code information in the picture with naked eyes, and inputs the identified verification code information into a form to be submitted to the website for verification, and a certain function can be used only after the verification succeeds.

During implementation of the present disclosure, the inventor finds that the existing technology has the following problems:

When a string of randomly-generated numbers or symbols are used as verification code information, security verification can be easily cracked, resulting in low reliability.

SUMMARY

An embodiment of the present disclosure provides a security verification method, including:

sending, an image capture request carrying an image capture parameter to a server end; where the image capture parameter includes:

at least one of a street view identifier, a course angle, a pitch angle, a view angle scope, an image capture width, and an image capture height;

receiving a live view picture from the server end, the live view picture being obtained by performing live view image capture according to the image capture parameter and prestored street view tile information; and performing a security verification operation according to the live view picture.

An embodiment of the present disclosure further provides a security verification method, including:

receiving an image capture request carrying image capture parameters sent by a terminal, where the image capture parameters include a first parameter and a second parameter, the first parameter includes a street view identifier and the second parameters includes at least one of a course angle, a pitch angle, a view angle scope, an image capture width, an image capture height, and a picture size; and performing live view image capture according to the image capture parameters and prestored street view tile information, and returning a live view picture obtained through the live view image capture to the terminal, so that the terminal performs a security verification operation according to the live view picture.

A terminal is provided, including:

a processor and a memory storing program instructions, where the processor executes the program instructions to:

send an image capture request carrying an image capture parameter to a server end; where the image capture parameter includes:

at least one of a street view identifier, a course angle, a pitch angle, a view angle scope, an image capture width, and an image capture height;

receive a live view picture from the server end, the live view picture being obtained by performing live view image capture according to the image capture parameter and prestored street view tile information; and perform a security verification operation according to the live view picture.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

In order to make objectives, technical solutions and advantages of the present disclosure clearer, embodiments of the present disclosure are described in detail in the following with reference to accompanying drawings.

For improving reliability of the verification code technology, in the embodiments of the present disclosure, security verification is performed by using a picture as verification code information, where the picture is a live view picture that is obtained by performing live view image capture according to an image capture parameter and street view tile information in a database. Compared with the existing technology that uses a number and a symbol as the verification code information, this solution uses the live view picture as the verification code information. Information borne by the live view picture is complex, and the live view picture is captured in real time, which is very difficult to be cracked, thereby improving reliability of security verification. In addition, a large quantity of street view tile information is often stored in the database, and the captured live view picture will be different when the image capture parameter slightly changes. Therefore, massive different live view pictures can be obtained according to the street view tile information in the database, providing good support for the security verification.

Embodiment 1

Figure 1:
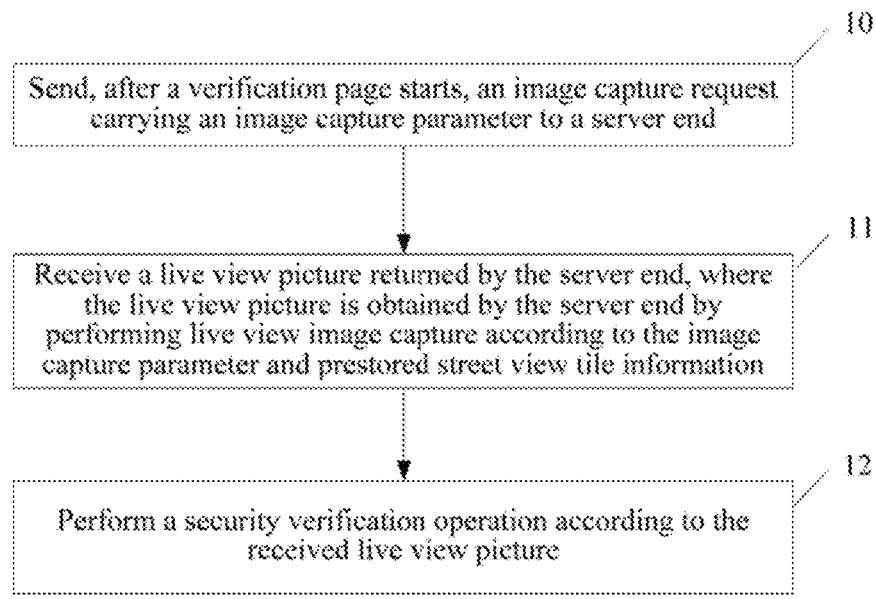
FIG. 1 is a schematic flowchart of a security verification method according to Embodiment 1 of the present disclosure.

Referring to FIG. 1, a security verification method provided in this embodiment of the present disclosure for a terminal side includes the following steps:

Step 10: Send, after a verification page starts, an image capture request carrying an image capture parameter to a server end.

Step 11: Receive a live view picture returned by the server end, where the live view picture is obtained by the server end by performing live view image capture according to the image capture parameter and prestored street view tile information.

Step 12: Perform a security verification operation according to the received live view picture.

Specifically, in step 12, the performing a security verification operation according to the live view picture may be specifically implemented as follows:

Firstly, image matting processing is performed on the live view picture, and a live view picture obtained after the image matting processing and subpictures obtained through matting are displayed.

Then, a jigsaw result obtained by a user according to the live view picture obtained after the image matting processing and the subpictures obtained through matting are verified, and a verification result is output.

Specifically, the foregoing performing image matting processing on the live view picture may be specifically implemented as follows:

The live view picture is divided into multiple subpictures, some of the subpictures are randomly selected, and the selected subpictures are removed from the live view picture. Herein, the image matting processing may be performed on the live view picture by invoking a production service interface of verification code correction. When the live view picture is divided into the multiple subpictures, sizes of the subpictures may be equal or unequal, for example, the live view picture may be divided, in a nine-rectangle-grid manner, into 9 subpictures with a same size.

Preferably, after the image matting processing is performed on the live view picture, noise may further be added into a live view picture obtained after the image matting processing, to prevent OCR.

Preferably, for further improving reliability of the security verification, when the subpictures obtained through matting is displayed, a sequence of the subpictures may be disturbed first, which is specifically: the subpictures obtained through matting are sorted according to a set method, so that an arrangement sequence of the subpictures after the sorting is different from a subpicture matting sequence; and then the subpictures after the sorting are displayed.

Specifically, the foregoing verifying a jigsaw result obtained by a user according to the live view picture obtained after the image matting processing and the subpictures obtained through matting may be specifically implemented as follows:

After the image matting processing is performed on the live view picture, it needs to display the live view picture after the image matting processing and the subpictures obtained through matting whose sequence has been disturbed; the user separately adds a subpicture to blank areas of the live view picture after the image matting processing, so as to piece together a complete live view picture; after the user completes a jigsaw operation, whether the picture pieced together by the user is the same as the live view picture before the image matting processing, and whether a sequence of the jigsaw of the user is a set sequence (for example, a sequence from top to bottom, and from left to right) are determined, where if both are yes, the verification succeeds, and otherwise, the verification fails. Specifically, whether a placement position of a subpicture is correct when the user places the subpicture into the live view picture obtained after the image matting processing, and whether a sequence in which the subpictures are placed into the live view picture obtained after the image matting processing is a set sequence are determined, where if both are yes, the verification succeeds, and otherwise, the verification fails.

For example, a method of the foregoing determining whether a placement position of a subpicture is correct when the user places the subpicture into the live view picture obtained after the image matting processing may be: after the live view picture is divided into the multiple subpictures, areas in which the subpictures in the live view picture is located and the subpictures are numbered and numbers are recorded, where the number of each subpicture is consistent with the number of an area in which the current subpicture is located in the live view picture; when the user each time places a subpicture into the live view picture obtained after the image matting processing, whether the subpicture is placed in an area corresponding to the number of the subpicture is determined, where if yes, a position in which the subpicture is placed this time is correct, and otherwise, the position in which the subpicture is placed this time is incorrect; and when the subpictures obtained through matting have all been placed into the live view picture after the image matting processing, and a placement position of each subpicture is correct, it is determined that placement positions of the subpictures are correct when the user place the subpictures into the live view picture obtained after the image matting processing, and otherwise, the placement positions of the subpictures are correct when the user place the subpictures into the live view picture obtained after the image matting processing are incorrect.

Further, after the jigsaw result is verified, if the verification of the jigsaw result does not succeed, resending the image capture request carrying an image capture parameter to the server end; receiving again a live view picture returned by the server end; and performing a user security verification operation according to the live view picture that is received again.

Specifically, the foregoing image capture parameter includes but is not limited to: at least one of a street view identifier, a course angle, a pitch angle, a view angle scope, an image capture width, and an image capture height.

In this embodiment of the present disclosure, an image capture request carrying an image capture parameter is sent to a server end after a verification page starts; a live view picture returned by the server end is received, where the live view picture is obtained by the server end by performing live view image capture according to the image capture parameter and prestored street view tile information; and a security verification operation is performed according to the live view picture. It can be seen that, in the method, the live view picture is used as the verification code information, which is very difficult to be cracked, thereby improving reliability of security verification.

Embodiment 2

Figure 2:
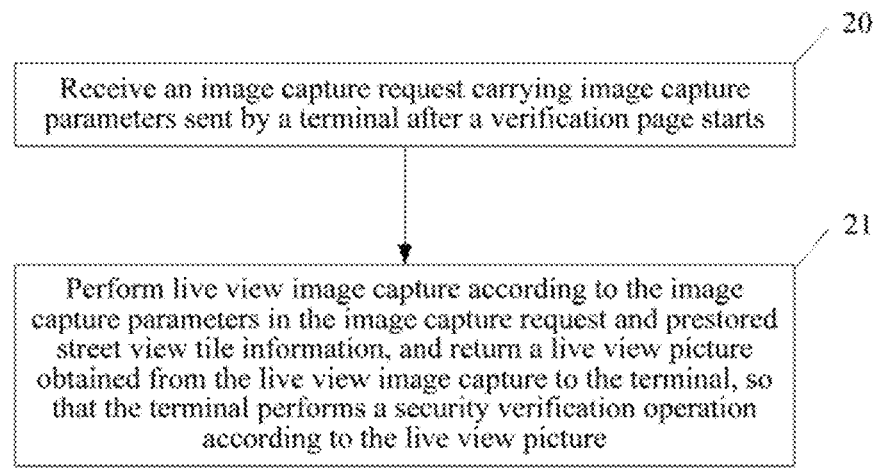
FIG. 2 is a schematic flowchart of a security verification method according to Embodiment 2 of the present disclosure.

Referring to FIG. 2, a security verification method provided in this embodiment of the present disclosure for a server end includes the following steps:

Step 20: Receive an image capture request carrying image capture parameters sent by a terminal after a verification page starts.

Step 21: Perform live view image capture according to the image capture parameters in the image capture request and prestored street view tile information, and return a live view picture obtained through the live view image capture to the terminal, so that the terminal performs a security verification operation according to the live view picture. Herein, street view tile information corresponding to a street view identifier in the image capture parameters may be read from a street view database by invoking an application programming interface (API) for map real-time image capture, a three-dimensional model may be constructed according to the read street view tile information, a three-dimensional image may be obtained according to the three-dimensional model, and image capture performed on the three-dimensional image according to another parameter in the image capture parameters, to obtain the live view picture.

Specifically, the image capture parameters include the street view identifier; and in step 21, the performing live view image capture according to the image capture parameters and prestored street view tile information may be specifically implemented as follows:

reading street view tile information corresponding to the street view identifier in the image capture parameters from a street view database;

constructing a three-dimensional model according to the read street view tile information, and obtaining a three-dimensional image according to the three-dimensional model; and performing image capture on the three-dimensional image according to another parameter except for the street view identifier in the image capture parameters, to obtain the live view picture.

Specifically, the foregoing another parameter includes but is not limited to: at least one of a course angle, a pitch angle, a view angle scope, an image capture width, an image capture height, and a picture size.

In this embodiment of the present disclosure, an image capture request carrying image capture parameters sent by a terminal after a verification page starts, is received; live view image capture is performed according to the image capture parameters and prestored street view tile information; and a live view picture obtained through the live view image capture is returned to the terminal, so that the terminal performs a security verification operation according to the live view picture. It can be seen that, in the method, the live view picture is used as the verification code information, which is very difficult to be cracked, thereby improving reliability of security verification.

Embodiment 3

Figure 3A:
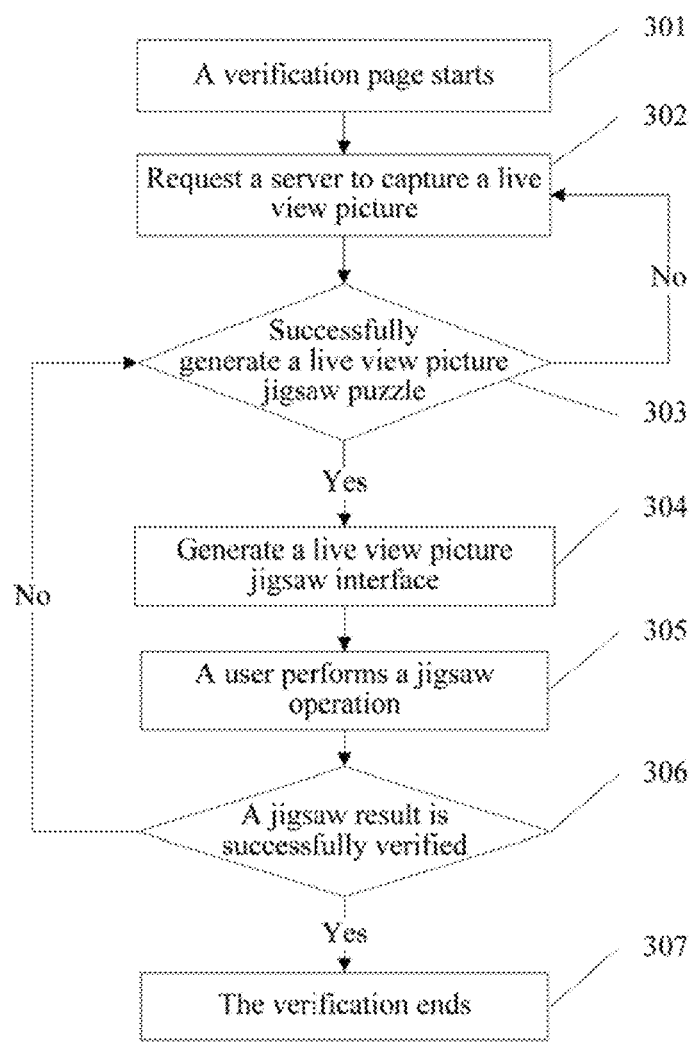
FIG. 3A is a schematic flowchart of picture verification in a user identity authentication process according to Embodiment 3 of the present disclosure.

This embodiment describes an example of security verification. As shown in FIG. 3A, a specific process is as follows:

Step 301: When a user logs in to a terminal, if the number of times for entering incorrect passwords in an identity authentication process exceeds a set numerical value, a verification page starts.

Step 302: The terminal sends an image capture request carrying image capture parameters to a server.

After receiving the image capture request, the server performs live view image capture according to the image capture parameters in the image capture request and prestored street view tile information, to obtain a live view picture; and specifically: the server may read street view tile information corresponding to a street view identifier in the image capture parameters from a street view database by invoking an application programming interface (API) for map real-time image capture, construct a three-dimensional model according to the read street view tile information, obtain a three-dimensional image according to the three-dimensional model, and perform image capture on the three-dimensional image according to a course angle, a pitch angle, a view angle scope, an image capture width, an image capture height, and the like in the image capture parameters, to obtain the live view picture; and the server returns the obtained live view picture to the terminal.

Figure 3B:
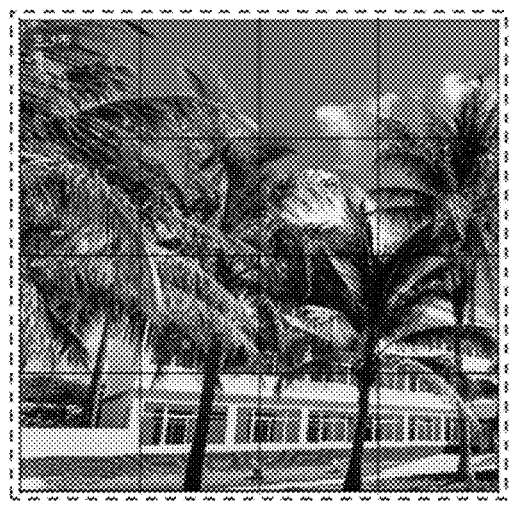
FIG. 3B is a schematic diagram of live view picture division according to Embodiment 3 of the present disclosure.
Figure 3C:
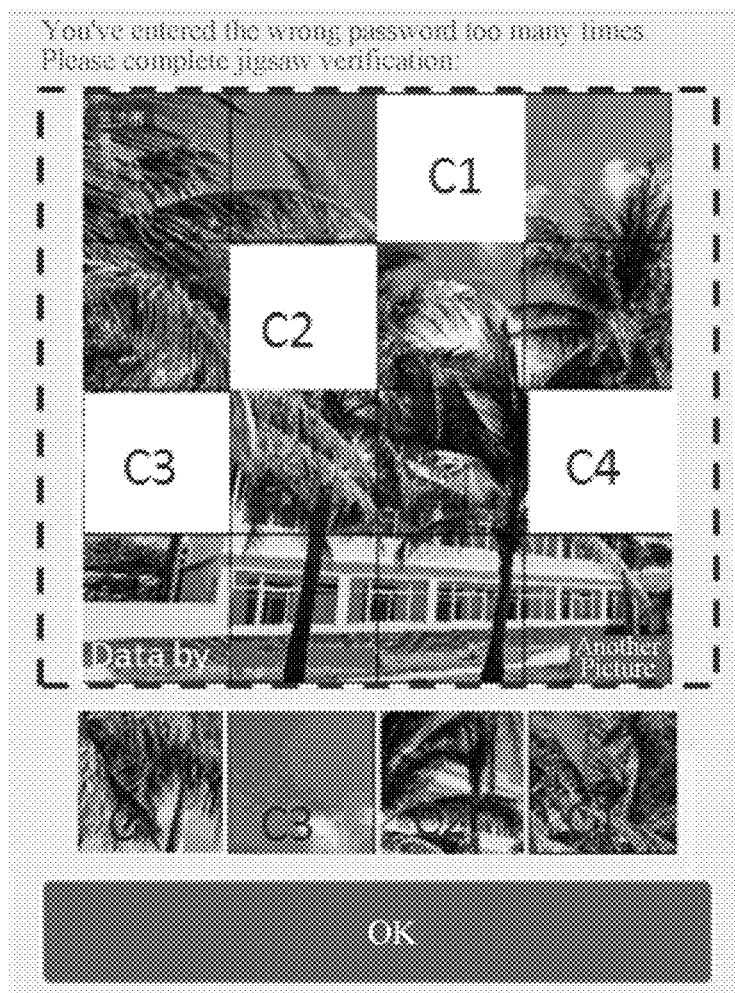
FIG. 3C is a schematic diagram of a live view picture jigsaw interface according to Embodiment 3 of the present disclosure.

Step 303: The terminal receives a live view picture returned by the server, and generates a live view picture jigsaw according to the live view picture, that is, performs image matting processing on the live view picture, and specifically may perform the image matting processing on the live view picture by invoking a production service interface of verification code correction; and specifically: firstly, the live view picture is divided into multiple pieces, and each piece is one subpicture, for example, as shown in FIG. 3B, the live view picture is evenly divided, in a nine-rectangle-grid manner, into 9 pieces; then some of the subpictures are randomly selected, and the selected subpictures are removed from the live view picture, as shown in FIG. 3C, a subpicture C1, a subpicture C2, a subpicture C3, and a subpicture C4 in the live view picture shown in FIG. 3B are removed, to obtain the live view picture jigsaw; and after the image matting processing, noise may further be added into the live view picture obtained after the image matting processing, to prevent OCR; and if the live view picture is generated successfully, perform step 304, and otherwise, return to step 302.

Step 304: The terminal generates a live view picture jigsaw interface, and displays, on the live view picture jigsaw interface, the live view picture after the image matting processing and the subpictures obtained through matting whose sequence has been disturbed; and as shown in FIG. 3C, the subpictures obtained through matting whose sequence has been disturbed are successively: a subpicture C4, a subpicture C3, a subpicture C2, and a subpicture C1.

Step 305: The user performs a jigsaw operation on the live view picture jigsaw interface, that is, places the subpictures on the live view picture jigsaw interface to corresponding positions C1, C2, C3, and C4 in sequence.

Step 306: After the user completes the jigsaw operation, the terminal verifies a jigsaw result, and specifically may verify the jigsaw result by invoking and verification interface of verification code correction, including verifying whether positions and a sequence in which the user adds the subpictures into the live view picture from which the subpictures have been obtained through matting are correct; for example, for FIG. 3C, if the user can add the subpicture C1 below to the C1 position above, add the subpicture C2 to the C2 position above, add the subpicture C3 to the C3 position above, and add the subpicture C4 to the C4 position above successively in a sequence from top to bottom, and from left to right, the jigsaw result is successfully verified, and otherwise, the jigsaw result is unsuccessfully verified; and if the jigsaw result is successfully verified, perform step 307, and otherwise, return to step 302.

Step 307: An entire process of the security verification ends.

Embodiment 4

Figure 4:
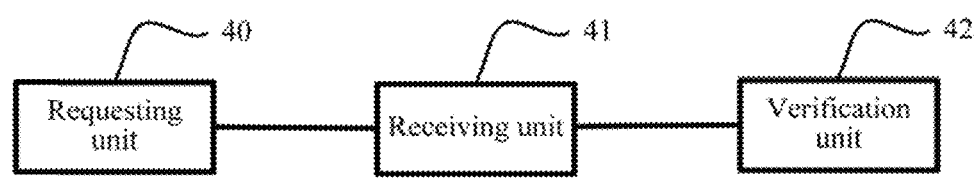
FIG. 4 is a schematic structural diagram of a security verification apparatus according to Embodiment 4 of the present disclosure.

Referring to FIG. 4, this embodiment of the present disclosure provides a security verification apparatus, including:

a requesting unit 40, configured to send, after a verification page starts, an image capture request carrying an image capture parameter to a server end;

a receiving unit 41, configured to receive a live view picture returned by the server end, the live view picture being obtained by the server end by performing live view image capture according to the image capture parameter and prestored street view tile information; and a verification unit 42, configured to perform a security verification operation according to the live view picture.

Further, the verification unit 42 is specifically configured to:

perform image matting processing on the live view picture, and display a live view picture obtained after the image matting processing and subpictures obtained through matting; and verify a jigsaw result obtained by a user according to the live view picture obtained after the image matting processing and the subpictures obtained through matting, and output a verification result.

Further, the verification unit 42 is specifically configured to:

divide the live view picture into multiple subpictures, randomly select some of the subpictures, and remove the selected subpictures from the live view picture.

Further, the verification unit 42 is specifically configured to:

determine whether a placement position of a subpicture is correct when the user places the subpicture into the live view picture obtained after the image matting processing, and whether a sequence in which the subpictures are placed into the live view picture obtained after the image matting processing is a set sequence, where if both are yes, the verification succeeds, and otherwise, the verification fails.

Further, the verification unit 42 is further configured to:

after the performing image matting processing on the live view picture and before the displaying a live view picture obtained after the image matting processing and subpictures obtained through matting, add noise into the live view picture obtained after the image matting processing.

Further, the verification unit 42 displays the subpictures obtained through matting according to the following method:

sorting, according to a set method, the subpictures obtained through matting, so that an arrangement sequence of the subpictures after the sorting is different from a sequence in which the subpictures are obtained through matting; and displaying the subpictures after the sorting.

Further, the requesting unit 40 is further configured to: if the verification of the jigsaw result does not succeed, resend the image capture request carrying an image capture parameter to the server end; the receiving unit is further configured to receive again a live view picture returned by the server end; and the verification unit 42 is further configured to perform a user security verification operation according to the live view picture that is received again.

Further, the image capture parameter includes:

at least one of a street view identifier, a course angle, a pitch angle, a view angle scope, an image capture width, and an image capture height.

In a security verification apparatus provided in this embodiment of the present disclosure, an image capture request carrying an image capture parameter is sent to a server end after a verification page starts; a live view picture returned by the server end is received, where the live view picture is obtained by the server end by performing live view image capture according to the image capture parameter and prestored street view tile information; and a security verification operation is performed according to the live view picture. It can be seen that, in the apparatus, the live view picture is used as the verification code information, which is very difficult to be cracked, thereby improving reliability of security verification.

Embodiment 5

Figure 5:
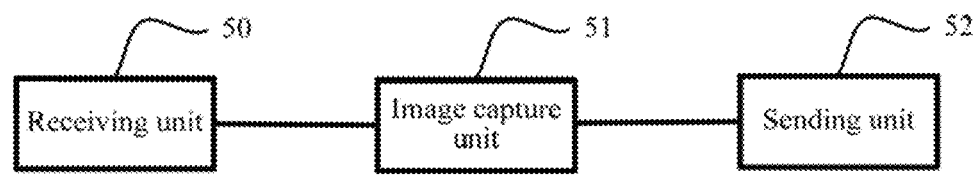
FIG. 5 is a schematic structural diagram of a security verification apparatus according to Embodiment 5 of the present disclosure.

Referring to FIG. 5, this embodiment of the present disclosure provides a security verification apparatus, including:

a receiving unit 50, configured to receive an image capture request carrying image capture parameters sent by a terminal after a verification page starts;

an image capture unit 51, configured to perform live view image capture according to the image capture parameters and prestored street view tile information; and a sending unit 52, configured to return a live view picture obtained through the live view image capture to the terminal, so that the terminal performs a security verification operation according to the live view picture.

Further, the image capture unit 51 is specifically configured to:

when the image capture parameters include a street view identifier, read street view tile information corresponding to the street view identifier from a street view database;

construct a three-dimensional model according to the read street view tile information, and obtain a three-dimensional image according to the three-dimensional model; and perform image capture on the three-dimensional image according to another parameter except for the street view identifier in the image capture parameters, to obtain the live view picture.

Further, the image capture parameters further include:

at least one of a course angle, a pitch angle, a view angle scope, an image capture width, an image capture height, and a picture size.

In a security verification apparatus provided in this embodiment of the present disclosure, an image capture request carrying image capture parameters sent by a terminal after a verification page starts, is received; live view image capture is performed according to the image capture parameters and prestored street view tile information; and a live view picture obtained through the live view image capture is returned to the terminal, so that the terminal performs a security verification operation according to the live view picture. It can be seen that, in the apparatus, a live view picture obtained through real-time image capture is returned to a terminal, so that the terminal performs security verification by using the live view picture as verification code information, and the verification code information is very difficult to be cracked, thereby improving reliability of security verification.

Embodiment 6

Figure 6:
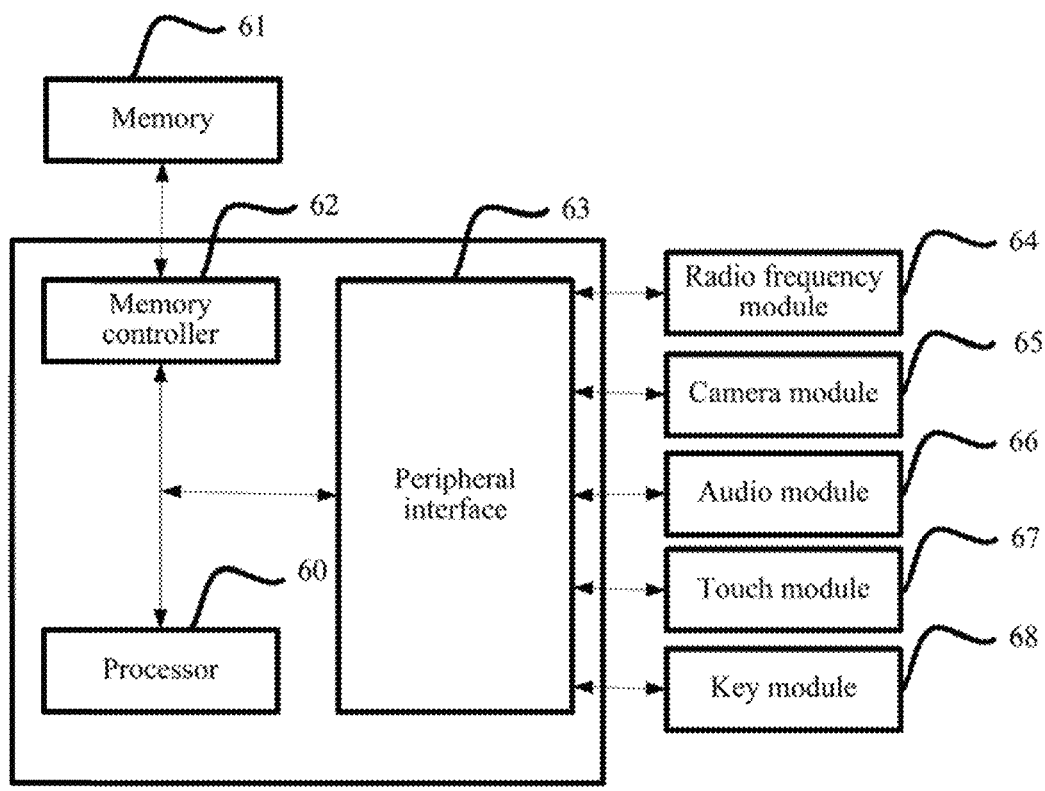
FIG. 6 is a schematic structural diagram of a terminal according to Embodiment 6 of the present disclosure.

Referring to FIG. 6, this embodiment of the present disclosure provides a terminal, where the terminal includes a processor 60, a memory 61, a memory controller 62, a peripheral interface 63, a radio frequency module 64, a camera module 65, an audio module 66, a touch screen 67, and a key module 68, a quantity of the processor 60 in the terminal may be one or more, and in FIG. 6, one processor 60 is used as an example; and the components in the terminal may be connected to each other by using one or more communication buses or signal lines, and in FIG. 6, an example in which the components are connected to each other by using buses is used.

As a computer readable storage medium, the memory 61 may be configured to store a software program, a computer executable program, and a module, for example, a program instruction/module (for example, a requesting unit 40, a receiving unit 41, and a verification unit 42 in a security verification apparatus) corresponding to a security verification method in this embodiment of the present disclosure. The processor 60 executes different functional applications of the terminal and performs data processing by running the software program, instruction and module that are stored in the memory 61, thereby implementing the foregoing security verification method on a terminal side.

It may be understood that FIG. 6 merely shows a schematic structure, and the terminal may also include more or fewer components than those shown in FIG. 6, or have a configuration different from that shown in FIG. 6. The components shown in FIG. 6 may be implemented by using hardware, software, or a combination thereof.

The memory 61 may mainly include a program storage area and a data storage area. The program storage area may store an operating system, an application program required by at least one function. The data storage area may store data created according to use of the terminal, and the like. In addition, the memory 61 may include a high speed random access memory, and may also include a non-volatile memory, such as at least one magnetic disk storage device, a flash memory, or another volatile solid-state storage device. In some embodiments, the memory 61 may further include memories remotely disposed relative to the processor 60, and these remote memories may be connected to the terminal through a network. Examples of the network include but are not limited to, the Internet, an intranet, a local area network, a mobile communications network, or a combination thereof. The processor 60 and other possible components may access the memory 61 under the control of the memory controller 62.

The peripheral interface 63 couples various input/output devices to a the processor 60 and the memory 61.

In some embodiments, the peripheral interface 63, the processor 60, and the memory controller 62 may be implemented in a single chip. In some other embodiments, they may be separately implemented by an independent chip.

The radio frequency module 64 is configured to receive and send an electromagnetic wave, and implement mutual conversion between the electromagnetic wave and an electric signal, so as to communicate with a communications network or another device. The radio frequency module 64 may include various existing electrical elements for performing these functions, such as an antenna, a radio frequency transceiver, a digital signal processor, a cipher/decipher chip, a subscriber identity module (SIM) card, and a memory; and the radio frequency module 64 may communicate with various networks such as the Internet, an intranet and a wireless network, or communicate with other devices through a wireless network. The wireless network may include a cellular telephone network, a wireless local area network, or a metropolitan area network. The wireless network may use various communications standards, protocols and technologies, which include, but are not limited to, Global System for Mobile Communications (GSM), Enhanced Data Rate for GSM Evolution (EDGE), Wideband Code Division Multiple Access (W-CDMA), Code Division Multiple Access (CDMA), Time Division Multiple Access (TDMA), Bluetooth, Wireless Fidelity (WiFi), Voice over Internet Protocol (VoIP), Worldwide Interoperability for Microwave Access (Wi-Max), other protocols for email, instant messaging and short message service, and any other suitable communications protocols, and even may include some protocols that have not been developed.

The camera module 65 is configured to capture a picture or video. The captured picture or video may be stored in the memory 61, and may be sent by using the radio frequency module 64.

The audio module 66 provides an audio interface for a user, and may include one or more microphones, one or more loudspeakers, and an audio circuit. The audio circuit receives audio data from the peripheral interface 63, converts the audio data into electric information, and transmits the electric information to the loudspeaker. The loudspeaker converts the electric information into an acoustic wave audible to the human ear. The audio circuit further receives electric information from the microphone, converts the electric information into audio data, and transmits the audio data to the peripheral interface 63 for further processing. The audio data may be acquired by using the memory 61 or by using the radio frequency module 64. In addition, the audio data may also be stored in the memory 61 or sent by the radio frequency module 64. In some embodiments, the audio module 66 may further include an earphone jack, for providing an audio interface for an earphone or another device.

The touch screen 67 provides an output and input interface between a terminal and the user. Specifically, the touch screen 67 displays a video output to the user, and content of the video output may include texts, images, videos, or any combination thereof. Some output results correspond to some user interface objects. The touch screen 67 further receives an input of the user, such as tapping, sliding, or other gesture operations of the user, so that the user interface object responds to the input of the user. The technology for detecting the input of the user may be a resistive touch detection technology, a capacitive touch detection technology, or any other possible touch detection technologies. Specific examples of a display unit of the touch screen 67 include but are not limited to a liquid crystal display and a light-emitting polymer display.

The key module 68 also provides an interface for the user to input information to the terminal, and the user presses different keys to enable the terminal to perform different functions.

The processor 60 may perform the following steps: sending an image capture request carrying an image capture parameter to a server end after a verification page starts; receiving a live view picture returned by the server end, where the live view picture is obtained by the server end by performing live view image capture according to the image capture parameter and prestored street view tile information; and performing a security verification operation according to the live view picture.

Specifically, when performing the security verification operation according to the live view picture, the processor 60 specifically performs image matting processing on the live view picture, and displays a live view picture obtained after the image matting processing and subpictures obtained through matting; and verifies a jigsaw result obtained by a user according to the live view picture obtained after the image matting processing and the subpictures obtained through matting, and outputs a verification result.

Further, when performing the image matting processing on the live view picture, the processor 60 specifically divides the live view picture into multiple subpictures, randomly selects some of the subpictures, and removes the selected subpictures from the live view picture.

Specifically, when verifying a jigsaw result obtained by a user according to the live view picture obtained after the image matting processing and the subpictures obtained through matting, the processor 60 specifically determines whether a placement position of a subpicture is correct when the user places the subpicture into the live view picture obtained after the image matting processing, and whether a sequence in which the subpictures are placed into the live view picture obtained after the image matting processing is a set sequence, where if both are yes, the verification succeeds, and otherwise, the verification fails.

Further, after performing image matting processing on the live view picture and before the displaying a live view picture obtained after the image matting processing and subpictures obtained through matting, the processor 60 may add noise into the live view picture obtained after the image matting processing.

Further, when displaying the subpictures obtained through matting, the processor 60 specifically sorts, according to a set method, the subpictures obtained through matting, so that an arrangement sequence of the subpictures after the sorting is different from a sequence in which the subpictures are obtained through matting; and displays the subpictures after the sorting.

Further, the processor 60 further performs the following operations: if the verification of the jigsaw result does not succeed, resending the image capture request carrying an image capture parameter to the server end; receiving again a live view picture returned by the server end; and performing a user security verification operation according to the live view picture that is received again.

In a terminal provided in this embodiment of the present disclosure, an image capture request carrying an image capture parameter is sent to a server end after a verification page starts; a live view picture returned by the server end is received, where the live view picture being obtained by the server end by performing live view image capture according to the image capture parameter and prestored street view tile information; and a security verification operation is performed according to the live view picture. It can be seen that, in the apparatus, the live view picture is used as the verification code information, which is very difficult to be cracked, thereby improving reliability of security verification.

Embodiment 7

Figure 7:
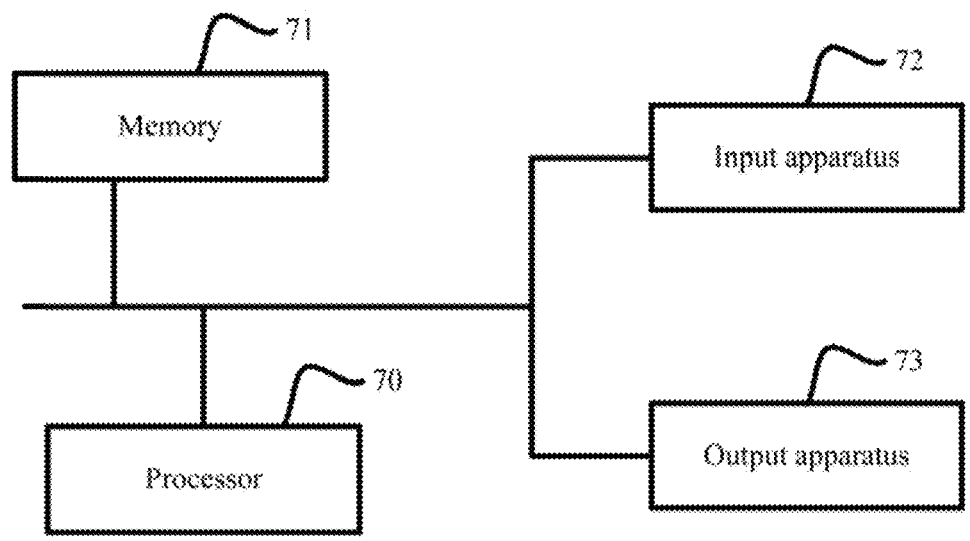
FIG. 7 is a schematic structural diagram of a server according to Embodiment 7 of the present disclosure.

Referring to FIG. 7, this embodiment of the present disclosure provides a server, where the server includes a processor 70, a memory 71, an input apparatus 72, and an output apparatus 73; a quantity of the processor 70 in the server may be one or more, and in FIG. 7, one processor 70 is used as an example; and the processor 70, the memory 71, the input apparatus 72, and the output apparatus 73 in the server may be connected to each other by using buses or in another manner, and in FIG. 7, an example in which the they are connected to each other by using buses is used.

As a computer readable storage medium, the memory 71 may be configured to store a software program, a computer executable program, and a module, for example, a program instruction/module (for example, a receiving unit 50, an image capture unit 51, and a sending unit 51 in a security verification apparatus) corresponding to a security verification method in this embodiment of the present disclosure. The processor 70 executes different functional applications of the server and performs data processing by running the software program, instruction and module that are stored in the memory 71, thereby implementing the foregoing security verification method on at the server end.

The memory 71 may mainly include a program storage area and a data storage area. The program storage area may store an operating system, an application program required by at least one function, and the like. The data storage area may store data created according to use of the server, and the like. In addition, the memory 71 may include a high speed random access memory, and may also include a non-volatile memory, such as at least one magnetic disk storage device, a flash memory, or another volatile solid-state storage device. In some embodiments, the memory 71 may further include memories remotely disposed relative to the processor 70, and these remote memories may be connected to the server through a network. Examples of the network include but are not limited to, the Internet, an intranet, a local area network, a mobile communications network, or a combination thereof.

The input apparatus 72 may be configured to receive input digit or character information, and generate a keyboard signal input related to the user setting and function control of a terminal. The output apparatus 73 may include a display device such as a screen.

The processor 70 may perform the following steps: receiving an image capture request carrying image capture parameters sent by a terminal after a verification page starts; performing live view image capture according to the image capture parameters and prestored street view tile information; and returning a live view picture obtained through the live view image capture to the terminal, so that the terminal performs a security verification operation according to the live view picture.

Specifically, when performing live view image capture according to the image capture parameters and prestored street view tile information, the processor 70 specifically reads, when the image capture parameters include a street view identifier, street view tile information corresponding to the street view identifier from a street view database; constructs a three-dimensional model according to the read street view tile information, and obtains a three-dimensional image according to the three-dimensional model; and performs image capture on the three-dimensional image according to another parameter except for the street view identifier in the image capture parameters, to obtain the live view picture.

In a server provided in this embodiment of the present disclosure, an image capture request carrying image capture parameters sent by a terminal after a verification page starts, is received; and live view image capture is performed according to the image capture parameters and prestored street view tile information, and a live view picture obtained through the live view image capture is returned to the terminal, so that the terminal performs a security verification operation according to the live view picture. It can be seen that, in the server, a live view picture obtained through real-time image capture is returned to a terminal, so that the terminal performs security verification by using the live view picture as verification code information, and the verification code information is very difficult to be cracked, thereby improving reliability of security verification.

Embodiment 8

Figure 8:
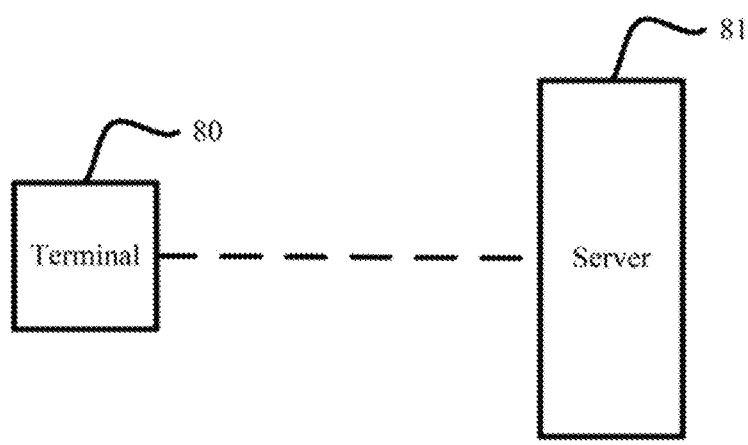
FIG. 8 is a schematic structural diagram of a system according to Embodiment 8 of the present disclosure.

Referring to FIG. 8, this embodiment of the present disclosure further provides a security verification system, including:

a terminal 80, configured to send, after a verification page starts, an image capture request carrying an image capture parameter to a server end; and receive a live view picture returned by the server end, and perform a security verification operation according to the live view picture; and a server 81, configured to receive the image capture request carrying an image capture parameters sent by the terminal; and perform live view image capture according to the image capture parameter and prestored street view tile information, and return a live view picture obtained through the live view image capture to the terminal.

For specific description about the terminal and the server in the system, reference may be separately made to the foregoing Embodiment 6 and Embodiment 7, and details are not provided again herein.

A terminal in a security verification system provided in this embodiment of the present disclosure sends an image capture request carrying an image capture parameter to a server end after a verification page starts; the server receives the image capture request sent by the terminal, performs live view image capture according to the image capture parameter in the image capture request and prestored street view tile information, and returns a live view picture obtained through the live view image capture to the terminal; and the terminal receives the live view picture returned by the server end, and performs a security verification operation according to the live view picture. It can be seen that, in the system, security verification is performed by using the live view picture as verification code information, and the verification code information is very difficult to be cracked, thereby improving reliability of security verification.

The present disclosure is described with reference to flowcharts and/or block diagrams of the method, device (system), and the computer program product in the embodiments of the present disclosure. It should be understood that computer program instructions can implement each process and/or block in the flowcharts and/or block diagrams and a combination of processes and/or blocks in the flowcharts and/or block diagrams. These computer program instructions may be provided to a general-purpose computer, a dedicated computer, an embedded processor, or a processor of another programmable data processing device to generate a machine, so that an apparatus configured to implement functions specified in one or more processes in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more processes in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more processes in the flowcharts and/or one or more blocks in the block diagrams.

Although some preferred embodiments of the present disclosure have been described, a person skilled in the art can make changes and modifications to these embodiments once the person learns the basic inventive concept. Therefore, the following claims are intended to be construed as to cover the preferred embodiments and all changes and modifications falling within the scope of the present disclosure.

Obviously, the person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A security verification method, comprising:
at a terminal having a processor and a memory storing programs executed by the processor;
sending an image capture request carrying an image capture parameter to a server end, wherein the image capture parameter comprises:
at least one of a street view identifier, a course angle, a pitch angle, a view angle scope, an image capture width, and an image capture height;
receiving a live view picture from the server end, the live view picture being obtained by performing live view image capture according to the image capture parameter and prestored street view tile information;
performing image matting processing on the live view picture by:
dividing the live view picture into a plurality of subpictures, randomly selecting at least one subpicture from the plurality of subpictures, and removing the selected subpicture from the live view picture; and
performing a security verification operation according to the processed live view picture.

2. The method according to claim 1, wherein performing a security verification operation according to the processed live view picture comprises:
displaying a second live view picture obtained after the image matting processing and a subpicture obtained through matting; and
verifying a jigsaw result obtained by a user according to the second live view picture and the subpicture to acquire a verification result.

3. The method according to claim 2, wherein the verifying a jigsaw result obtained by a user according to the second live view picture and the subpicture to acquire a verification result comprises:
determining that the verification result is successful, in a case of determining that a placement position of a subpicture is correct when the user places the subpicture into the second live view picture, and determining that a sequence in which the subpicture is placed into the second live view picture is a set sequence.

4. The method according to claim 2, wherein after the performing image matting processing on the live view picture and before the displaying a second live view picture obtained after the image matting processing and a subpicture obtained through matting, the method further comprises: adding noise into the second live view picture.

5. The method according to claim 2, wherein the displaying a subpicture obtained through matting comprises:
sorting a plurality of subpictures obtained through matting, so that an arrangement sequence of the plurality of subpictures after the sorting is different from a sequence in which the plurality of subpictures are obtained through matting; and
displaying the plurality of subpictures in the arrangement sequence.

6. The method according to claim 2, further comprising:
in a case that the verification result acquired by verifying the jigsaw result is not successful, resending the image capture request carrying an image capture parameter to the server end; receiving a third live view picture from the server end; and performing a second security verification operation according to the third live view picture.

7. The method according to claim 2, comprising:
outputting the verification result.

8. A security verification method, comprising:
receiving an image capture request carrying image capture parameters sent by a terminal, the image capture parameters comprising a first parameter and a second parameter, wherein the first parameter comprises a street view identifier and the second parameters comprises at least one of a course angle, a pitch angle, a view angle scope, an image capture width, an image capture height, and a picture size; and
performing live view image capture according to the image capture parameters and prestored street view tile information, and returning a live view picture obtained through the live view image capture to the terminal, so that the terminal performs image matting processing on the live view picture by dividing the live view picture into a plurality of subpictures, randomly selecting at least one subpicture from the plurality of subpictures, and removing the selected subpicture from the live view picture; and performs a security verification operation according to the processed live view picture.

9. The method according to claim 8, wherein the performing live view image capture according to the image capture parameters and prestored street view tile information comprises:
reading street view tile information corresponding to the street view identifier from a street view database;
constructing a three-dimensional model according to the street view tile information, and obtaining a three-dimensional image according to the three-dimensional model;
performing image capture on the three-dimensional image according to the second parameter to obtain the live view picture.

10. A terminal, comprising:
a processor and a memory storing program instructions, wherein the processor executes the program instructions to:
send an image capture request carrying an image capture parameter to a server end, wherein the image capture parameter comprises:
at least one of a street view identifier, a course angle, a pitch angle, a view angle scope, an image capture width, and an image capture height;
receive a live view picture from the server end, the live view picture being obtained by performing live view image capture according to the image capture parameter and prestored street view tile information;
perform image matting processing on the live view picture by:
dividing the live view picture into a plurality of subpictures, randomly selecting at least one subpicture from the plurality of subpictures, and removing the selected subpicture from the live view picture; and
perform a security verification operation according to the processed live view picture.

11. The terminal according to claim 10, wherein the processor executes the program instructions further to:
display a second live view picture obtained after the image matting processing and a subpicture obtained through matting; and
verify a jigsaw result obtained by a user according to the second live view picture and the subpicture to acquire a verification result.

12. The terminal according to claim 11, wherein the processor executes the program instructions further to:
determine that the verification result is successful, in a case of determining that a placement position of a subpicture is correct when the user places the subpicture into the second live view picture, and determining that a sequence in which the subpicture is placed into the second live view picture is a set sequence.

13. The terminal according to claim 11, wherein the processor executes the program instructions further to:
after the performing image matting processing on the live view picture and before the displaying a second live view picture obtained after the image matting processing and a subpicture obtained through matting, add noise into the second live view picture.

14. The terminal according to claim 11, wherein the processor executes the program instructions further to:
sort a plurality of subpictures obtained through matting, so that an arrangement sequence of the plurality of subpictures after the sorting is different from a sequence in which the plurality of subpictures are obtained through matting; and
display the plurality of subpictures in the arrangement sequence.

15. The terminal according to claim 11, wherein the processor executes the program instructions further to: in a case that the verification result acquired by verifying the jigsaw result is not successful, resend the image capture request carrying an image capture parameter to the server end;
receive a third live view picture from the server end; and
perform a second security verification operation according to the third live view picture.

16. The terminal according to claim 11, wherein the processor executes the program instructions further to: output the verification result.

* * * * *